(12) United States Patent
Wang

(10) Patent No.: US 12,191,442 B2
(45) Date of Patent: Jan. 7, 2025

(54) ELECTROCHEMICAL DEVICE AND ELECTRONIC DEVICE INCLUDING SAME

(71) Applicant: NINGDE AMPEREX TECHNOLOGY LIMITED, Ningde (CN)

(72) Inventor: Kefei Wang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 0 days.

(21) Appl. No.: 18/320,077

(22) Filed: May 18, 2023

(65) Prior Publication Data

US 2023/0290998 A1 Sep. 14, 2023

Related U.S. Application Data

(63) Continuation of application No. 16/419,664, filed on May 22, 2019, now abandoned.

(30) Foreign Application Priority Data

Mar. 18, 2019 (CN) .................. 201910203680.X

(51) Int. Cl.
| | | |
|---|---|---|
| *H01M 10/0525* | (2010.01) | |
| *H01M 4/02* | (2006.01) | |
| *H01M 4/133* | (2010.01) | |
| *H01M 4/36* | (2006.01) | |
| *H01M 4/38* | (2006.01) | |
| *H01M 4/583* | (2010.01) | |
| *H01M 4/60* | (2006.01) | |
| *H01M 4/62* | (2006.01) | |
| *H01M 10/0567* | (2010.01) | |
| *H01M 10/0568* | (2010.01) | |
| *H01M 10/0569* | (2010.01) | |

(52) U.S. Cl.
CPC ....... *H01M 10/0525* (2013.01); *H01M 4/133* (2013.01); *H01M 4/362* (2013.01); *H01M 4/386* (2013.01); *H01M 4/583* (2013.01); *H01M 4/60* (2013.01); *H01M 4/622* (2013.01); *H01M 10/0567* (2013.01); *H01M 10/0568* (2013.01); *H01M 10/0569* (2013.01); *H01M 2004/021* (2013.01); *H01M 2004/027* (2013.01)

(58) Field of Classification Search
CPC .. H01M 10/0525; H01M 4/133; H01M 4/362; H01M 4/386; H01M 4/583; H01M 10/0567; H01M 10/0568; H01M 10/0569
See application file for complete search history.

(56) References Cited

U.S. PATENT DOCUMENTS

| | | | | |
|---|---|---|---|---|
| 2006/0003232 A1* | 1/2006 | Jung | ................. | H01M 10/0525 429/231.95 |
| 2012/0308881 A1* | 12/2012 | Tokuda | ............. | H01M 10/0567 429/199 |
| 2017/0155151 A1 | 6/2017 | Bae et al. | | |
| 2017/0288268 A1* | 10/2017 | Kim | .................. | H01M 10/0569 |

FOREIGN PATENT DOCUMENTS

| | | | |
|---|---|---|---|
| CN | 1808745 A | * | 7/2006 |
| CN | 101174683 A | | 5/2008 |
| CN | 101174683 B | | 5/2010 |
| CN | 102134065 A | | 7/2011 |
| CN | 102306833 A | | 1/2012 |
| CN | 102306834 A | | 1/2012 |
| CN | 103000944 A | | 3/2013 |
| CN | 104347880 A | | 2/2015 |
| CN | 204204956 U | | 3/2015 |
| CN | 104659415 A | | 5/2015 |
| CN | 104752683 A | | 7/2015 |
| CN | 104810554 A | | 7/2015 |
| CN | 102473955 B | | 8/2015 |
| CN | 105336914 A | | 2/2016 |
| CN | 105826600 A | | 8/2016 |
| CN | 103378357 B | | 8/2017 |
| CN | 107666011 A | | 2/2018 |
| CN | 109980225 A | | 7/2019 |
| JP | 2006019274 A | | 1/2006 |
| JP | 2011054462 A | | 3/2011 |
| JP | 2011-192632 A | | 9/2011 |
| KR | 20060097483 A | | 9/2006 |
| KR | 20090063174 A | | 6/2009 |
| KR | 20130134910 A | | 12/2013 |
| KR | 20140147414 A | | 12/2014 |
| WO | 2017111143 A1 | | 6/2007 |

(Continued)

OTHER PUBLICATIONS

International Search Report mailed Apr. 10, 2020 in counterpart PCT application PCT/CN2020/071471, 5 pages.
Chinese First Office Action mailed Apr. 24, 2020 in counterpart Chinese application CN201910203680.X, 18 pages in Chinese.
"Research on Key Issues of Industrialization of Sealed Zinc-Ni Battery," Jun Hu, China Masters Degree Thesis, Central South University, Engineering Science and Technology Series II, No. 4, 2010 , published Apr. 15, 2010, 9 pages in Chinese, 2 pages in English.

(Continued)

*Primary Examiner* — Basia A Ridley
*Assistant Examiner* — Heng M. Chan
(74) *Attorney, Agent, or Firm* — XSENSUS LLP

(57) ABSTRACT

This application relates to an electrochemical device and an electronic device including the same. In particular, this application provides an electrochemical device, including a cathode, an anode and an electrolytic solution, where the anode includes a carbon material and hydroxyalkyl methylcellulose, and the electrolytic solution includes propionate. The electrochemical device of this application has excellent cycle, storage and low-temperature performance.

17 Claims, No Drawings

(56) References Cited

FOREIGN PATENT DOCUMENTS

| | | |
|---|---|---|
| WO | 2012001844 A1 | 1/2012 |
| WO | 2015037558 A1 | 3/2015 |
| WO | 2017195562 A1 | 11/2017 |

OTHER PUBLICATIONS

Chinese First Office Action mailed Apr. 30, 2021 in counterpart Chinese application CN202010808266.4.X, 6 pages in Chinese.
Chinese Second Office Action mailed Aug. 17, 2021 in counterpart Chinese application CN202010808266.4.X, 4 pages in Chinese.
India First Office Action mailed Nov. 2, 2021 in counterpart Indian application 202027012581, 5 pages in English.
Japanese Notice of Rejection mailed Aug. 31, 2021 in counterpart Japanese application 2020-517475, 5 pages in Japanese.
Decision to Grant a Patent mailed Apr. 19, 2022, in Japanese Patent Application No. 2020-517475, 4 pages(with translation).
Supplementary European Search Report mailed Oct. 20, 2023, in European Patent Application 20711021.4, 6 pages.

\* cited by examiner

ELECTROCHEMICAL DEVICE AND ELECTRONIC DEVICE INCLUDING SAME

CROSS REFERENCE TO RELATED APPLICATIONS

The present application is a continuation application of U.S. Ser. No. 16/419,664, which claims the benefit of priority from the China Patent Application No. 201910203680.X, filed on 18 Mar. 2019, the disclosure of which is hereby incorporated by reference in its entirety.

BACKGROUND

1. Technical Field

This application relates to the field of energy storage technologies, and in particular to an electrochemical device and an electronic device including the same, and more particularly to a lithium-ion battery.

2. Description of the Related Art

With the development of technologies and the increasing demand for mobile devices, the demand for electrochemical devices has increased significantly. An electrochemical device with both high energy density and excellent service life and cycle performance is of primary research focus.

The theoretical capacity of an electrochemical device (e.g., a lithium-ion battery) may vary depending on the type of an anode active material. As its number of cycles increases, a lithium-ion battery will generally have a decrease in its charge/discharge capacity, causing the deterioration in the performance of the lithium-ion battery.

In view of this, it is indeed necessary to provide an improved electrochemical device having excellent cycle, storage and low-temperature performance and an electronic device including the same.

SUMMARY

The embodiments of this application seek to resolve at least one of the problems existing in the related art by providing an electrochemical device and an electronic device including the same.

In one embodiment, this application provides an electrochemical device, including a cathode, an anode and an electrolytic solution, where the anode includes a carbon material and hydroxyalkyl methylcellulose, and the electrolytic solution includes propionate.

According to the embodiments of this application, the specific surface area of the carbon material is less than or equal to about 3 m²/g. In some embodiments, the specific surface area of the carbon material is less than or equal to about 2.5 m²/g. In some embodiments, the specific surface area of the carbon material is less than or equal to about 2 m²/g. In some embodiments, the specific surface area of the carbon material is in the range of about 1.5 m²/g to about 2 m²/g.

According to the embodiments of this application, the carbon material is selected from one or more of natural graphite and artificial graphite.

According to the embodiments of this application, the anode further includes one or more of a silicon material, a silicon-carbon composite material, a silicon-oxygen material, an alloy material and a lithium-containing metal composite oxide material.

According to the embodiments of this application, the hydroxyalkyl methylcellulose is selected from one or more of hydroxyalkyl methylcellulose sodium and hydroxyalkyl methylcellulose lithium, and the alkyl has 1-8 carbon atoms.

According to the embodiments of this application, the propionate is selected from compounds of Formula 1:

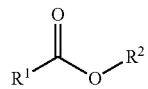

Formula 1 where:
$R^1$ is ethyl or haloethyl, and
$R^2$ is alkyl or haloalkyl having 1-6 carbon atoms.

According to the embodiments of this application, the propionate is selected from one or more of the following: methyl propionate, ethyl propionate, propyl propionate, butyl propionate, amyl propionate, methyl halopropionate, ethyl halopropionate, propyl halopropionate, butyl halopropionate and amyl halopropionate.

According to the embodiments of this application, the content of the propionate is about 10%-about 65% based on the total weight of the electrolytic solution. In some embodiments, the content of the propionate is about 15%-about 60% based on the total weight of the electrolytic solution. In some embodiments, the content of the propionate is about 30%-about 50% based on the total weight of the electrolytic solution. In some embodiments, the content of the propionate is about 30%-about 40% based on the total weight of the electrolytic solution.

According to the embodiments of this application, the electrolytic solution further includes an additive.

According to the embodiments of this application, the additive is selected from one or more of the following: fluorocarbonate, carbon-carbon double bond-containing ethylene carbonate, a sulfur-oxygen double bond-containing compound, a compound having 2-4 cyano groups, a cyclic carboxylate, a cyclic phosphoric anhydride, a carboxylic anhydride, a sulfonic anhydride and a carboxylic sulfonic anhydride.

According to the embodiments of this application, the content of the additive is about 0.01%-about 15% based on the total weight of the electrolytic solution. In some embodiments, the content of the additive is about 0.1%-about 10% based on the total weight of the electrolytic solution. In some embodiments, the content of the additive is about 1%-about 5% based on the total weight of the electrolytic solution.

According to the embodiments of this application, the fluorocarbonate has the formula $C=O(OR_1)(OR_2)$, where $R_1$ and $R_2$ are each selected from alkyl or haloalkyl having 1-6 carbon atoms, where at least one of $R_1$ and $R_2$ is selected from fluoroalkyl having 1-6 carbon atoms, and $R_1$ and $R_2$ optionally form a 5- to 7-membered ring along with the atoms to which they are connected.

According to the embodiments of this application, the fluorocarbonate is selected from one or more of the following: fluoroethylene carbonate, cis 4,4-difluoroethylene carbonate, trans 4,4-difluoroethylene carbonate, 4,5-difluoroethylene carbonate, 4-fluoro-4-methylethylene carbonate, 4-fluoro-5-methylethylene carbonate, methyl trifluoromethyl carbonate, methyl trifluoroethyl carbonate and ethyl trifluoroethyl carbonate.

According to the embodiments of this application, the content of the propionate is about 1.5-about 30 times the additive based on the total weight of the electrolytic solution. In some embodiments, the content of the propionate is about 1.5-about 20 times the additive based on the total weight of the electrolytic solution. In some embodiments, the content of the propionate is about 2-about 20 times the additive based on the total weight of the electrolytic solution. In some embodiments, the content of the propionate is about 5-about 20 times the additive based on the total weight of the electrolytic solution.

According to the embodiments of this application, the electrolytic solution further includes one or more of the following: $LiPF_6$, $LiBF_4$, $LiPO_2F_2$, $LiSbF_6$, $LiAsF_6$, $LiC_4F_9SO_3$, $LiClO_4$, $LiB(C_2O_4)_2$ and $LiN(C_xF_{2x+1}SO_2)(C_yF_{2y+1}SO_2)$, where x and y are integers of 1-5.

In another embodiment, this application provides an electronic device including an electrochemical device as described above.

Additional aspects and advantages of the embodiments of this application will be described or shown in the following description or interpreted by implementing the embodiments of this application.

DETAILED DESCRIPTION

Embodiments of this application are described in detail below. The embodiments of this application should not be construed as limiting this application.

Unless otherwise expressly indicated, the following terms used herein have the meanings indicated below.

The term "about" is used to describe and explain minor changes. When being used in combination with an event or circumstance, the term may refer to an example in which the event or circumstance occurs precisely, and an example in which the event or circumstance occurs approximately. For example, when used in conjunction with a numerical value, the terms may refer to a variation range that is less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios and other numerical values are sometimes presented herein in a range format. It should be appreciated that such range formats are for convenience and conciseness, and should be flexibly understood as comprising not only values explicitly specified to range constraints, but also all individual values or sub-ranges within the ranges, like explicitly specifying each value and each sub-range.

A list of items connected by the term "one of" or similar terms may mean any of the listed items. For example, if items A and B are listed, then the phrase "one of A and B" means only A or only B. In another example, if items A, B, and C are listed, then the phrase "one of A, B and C" means only A; only B; or only C. The item A may include a single component or multiple components. The item B may include a single component or multiple components. The item C may include a single component or multiple components.

A list of items connected by the term "one or more of" or similar terms may mean any combination of the listed items. For example, if items A and B are listed, then the phrase "one or more of A and B" means only A; only B; or A and B. In another example, if items A, B and C are listed, then the phrase "one or more of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

The term "alkyl" refers to a linear or branched chained saturated hydrocarbon structure having 1 to 20 carbon atoms. In some embodiments, the alkyl has 1 to 8 carbon atoms. In some embodiments, the alkyl has 1 to 6 carbon atoms. When an alkyl having a specific carbon number is specified, it is intended to cover all geometric isomers having that carbon number; therefore, for example, "butyl" means to include n-butyl, sec-butyl, isobutyl, tert-butyl and cyclobutyl; and "propyl" includes n-propyl, isopropyl and cyclopropyl. Examples of alkyl include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornyl and the like.

The term "hydroxyalkyl" refers to an alkyl group as defined above, where at least one hydrogen atom is replaced by a hydroxy group. Exemplary hydroxyalkyl groups include, but are not limited to, hydroxymethyl, hydroxyethyl (where the hydroxy group is at the 1- or 2-position), hydroxypropyl (where the hydroxy group is at 1-, 2- or 3-position), hydroxybutyl (where the hydroxy group is at the 1-, 2-, 3- or 4-position), hydroxypentyl (where the hydroxy group is at the 1-, 2-, 3-, 4- or 5-position)), hydroxyhexyl (where the hydroxy group is at the 1-, 2-, 3-, 4-, 5- or 6-position), 1,2-dihydroxyethyl and the like.

As used herein, the content of each component is a mass percentage based on the total weight of the electrolytic solution.

The theoretical capacity of an electrochemical device (e.g., a lithium-ion battery) may vary depending on the type of the anode active material. As the number of cycles increases, lithium-ion batteries generally have a decrease in charge/discharge capacity. This is because the volume change of the electrodes during charging and discharging of the lithium-ion battery causes separation between the electrode active materials or between the electrode active material and the electrode current collector, resulting in the electrode active material not functioning well. In addition, during the charging/discharging of a lithium-ion battery, a change in electrode volume causes deformation of the electrode (for example, the interface film of the solid electrolyte is damaged), thereby exacerbating the consumption of lithium in the electrolyte solution, so that the electrode active material and the lithium-ion battery are deteriorated. The use of an adhesive having low is adhesion (for example, carboxymethylcellulose) is one of the main causes of deterioration in performance of the lithium-ion battery.

This application resolves this problem by using specific electrode materials. In the charging/discharging process of the electrochemical device of this application, even if the electrode volume changes, the electrode material has a strong adhesion due to the inclusion of a specific adhesive, which can improve the structural stability of the electrode and prevent deterioration caused by separation of the active material, thereby improving the performance of the electrochemical device.

On the other hand, this application uses a specific electrode material in combination with a specific electrolytic solution to significantly suppress the decomposition reaction of the electrolytic solution after high-temperature charging, thereby improving the performance of the electrochemical device.

In one embodiment, this application provides an electrochemical device, including a cathode, an anode and an electrolytic solution as described below. In some embodiments, the electrochemical device further includes a separator disposed between the cathode and the anode.

1. Anode

The anode includes an anode current collector and an anode active material layer disposed on one or two surfaces of the anode current collector.

The anode current collector includes an anode conductive material. In some embodiments, the anode current collector includes, but is not limited to, copper, nickel and stainless steel. In some embodiments, the surface of the anode current collector is roughened, and the roughened surface can improve the adhesion of the anode active material. In some embodiments, the roughened anode current collector includes, but is not limited to, electrolytic copper foil.

The anode active material layer includes an anode active material and an anode adhesive. The anode active material layer may be one or more layers. Each of the plurality of layers of the anode active material may include the same or different anode active materials. The anode active material is any material capable of deintercalating metal ions such as lithium ions. In some embodiments, the chargeable capacity of the anode active material is greater than the discharge capacity of a cathode active material to prevent the lithium metal from unintentionally precipitating on the anode during charging.

One of the main features of the electrochemical device of this application is that one or more carbon materials are included in the anode as the anode active material.

In some embodiments, the specific surface area of the carbon material is less than or equal to about 3 $m^2/g$. In some embodiments, the specific surface area of the carbon material is less than or equal to about 2.5 $m^2/g$. In some embodiments, the specific surface area of the carbon material is less than or equal to about 2 $m^2/g$. In some embodiments, the specific surface area of the carbon material is in the range of about 1.5 $m^2/g$ to about 2 $m^2/g$. Combining the above-described carbon material having a particular specific surface area with a specific type of anode adhesive (for example, hydroxyalkyl methylcellulose) and an electrolytic solution solvent (for example, propionate) can significantly suppress the decomposition reaction of the electrolytic solution after high-temperature charging, thereby improving the performance of the electrochemical device.

In some embodiments, the carbon material is selected from one or more of natural graphite and artificial graphite. In some embodiments, the carbon material includes artificial graphite.

In some embodiments, the shape of the carbon material includes, but is not limited to, fibrous, spherical, granular, and scaly.

In some embodiments, the anode further includes one or more of a silicon material, a silicon-carbon composite material, a silicon-oxygen material, an alloy material and a lithium-containing metal composite oxide material. In some embodiments, the anode active material layer further includes other types of anode active materials. For example, one or more is materials include metal elements and metalloid elements capable of forming an alloy with lithium. Examples of the metal elements and metalloid elements include, but are not limited to, Mg, B, Al, Ga, In, Si, Ge, Sn, Pb, Bi, Cd, Ag, Zn, Hf, Zr, Y, Pd and Pt. In particular, Si, Sn, or a combination thereof may be used because Si and Sn have excellent capacity to deintercalate lithium ions, and can provide a high energy density for an electrochemical device.

In some embodiments, anode active materials of other types may further include one or more of metal oxides and a high-molecular compound. In some embodiments, the metal oxides include, but are not limited to, iron oxide, ruthenium oxide and molybdenum oxide. In some embodiments, the high-molecular compound includes, but is not limited to, polyacetylene, polyaniline and polypyrrole.

Another main feature of the electrochemical device of this application is that hydroxyalkyl methylcellulose is included in the anode as an anode adhesive. The hydroxyalkyl methylcellulose has excellent adhesion and dispersibility with the carbon material.

In some embodiments, the hydroxyalkyl methylcellulose is selected from one or more of hydroxyalkyl methylcellulose sodium and hydroxyalkyl methylcellulose lithium, and the alkyl has 1-8 carbon atoms. In some embodiments, the hydroxyalkyl methylcellulose includes, but is not limited to, one or more of hydroxyalkyl methylcellulose sodium and hydroxyalkyl methylcellulose lithium, where the alkyl includes methyl, ethyl, propyl or butyl. The use of the hydroxyalkyl methylcellulose in combination with a specific type of electrolytic solution solvent (for example, propionate) can significantly suppress the increase in thickness of the electrochemical device after high-temperature charging.

In some embodiments, the anode adhesive further includes one or more of styrene-butadiene rubber, fluororubber and ethylene propylene diene copolymer.

In some embodiments, the anode active material layer further includes is other materials, for example, an anode conductive agent. In some embodiments, the anode conductive agent includes one or more of a conductive metal material and a conductive polymer. In some embodiments, the anode conductive agent includes one or more of a carbon material or the like. In some embodiments, the carbon material includes, but is not limited to, graphite, carbon black, acetylene black and Ketjen black.

2. Electrolytic Solution

The electrolytic solution used in the electrochemical device of this application includes an electrolyte and a solvent that dissolves the electrolyte. In some embodiments, the electrolytic solution used in the electrochemical device of this application further includes an additive.

(1) Solvent

One of the main features of the electrochemical device of this application is that the electrolytic solution includes propionate as a solvent. In the case where the anode active material is a carbon material and the anode adhesive is hydroxypropyl methylcellulose, the use of propionate as a solvent for the electrolytic solution can improve the chemical stability of the electrolytic solution and inhibit the gas production phenomenon of the electrochemical device after high-temperature charging, thereby reducing the thickness expansion of the electrochemical device.

In some embodiments, the propionate is selected from compounds of Formula 1:

Formula 1

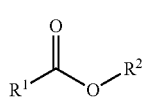

where:

$R^1$ is ethyl or haloethyl, and $R^2$ is alkyl or haloalkyl having 1-6 carbon atoms.

In some embodiments, the propionate includes, but is not limited to, methyl propionate, ethyl propionate, propyl propionate, butyl propionate, amyl propionate, methyl halopropionate, ethyl halopropionate, propyl halopropionate, butyl halopropionate and amyl halopropionate. In some embodiments, the halo group in the methyl halopropionate, ethyl halopropionate, propyl halopropionate, butyl halopropionate and amyl halopropionate is selected from one or more of a fluoro group (—F), a chloro group (—Cl), a bromo group (—Br) and an iodo group (—I). In some embodiments, the halo group is a fluoro group (—F), which can achieve a more excellent effect.

In some embodiments, the content of the propionate is about 10%-about 65% based on the total weight of the electrolytic solution. In some embodiments, the content of the propionate is about 15%-about 60% based on the total weight of the electrolytic solution. In some embodiments, the content of the propionate is about 30%-about 50% based on the total weight of the electrolytic solution. In some embodiments, the content of the propionate is about 30%-about 40% based on the total weight of the electrolytic solution. A more excellent effect can be achieved by using the propionate having the above content.

In some embodiments, the electrolytic solution further includes any non-aqueous solvent known in the prior art as a solvent of the electrolytic solution.

In some embodiments, the non-aqueous solvent includes, but is not limited to, one or more of the following: cyclic carbonate, chained carbonate, cyclic carboxylate, chained carboxylate, cyclic ether, chained ether, phosphorus-containing organic solvent, a sulfur-containing organic solvent and an aromatic fluorine-containing solvent.

In some embodiments, the cyclic carbonate includes, but is not limited to, one or more of the following: ethylene carbonate (EC), propylene carbonate (PC) and butylene carbonate. In some embodiments, the cyclic carbonate has 3-6 carbon atoms.

In some embodiments, the chained carbonate includes, but is not limited to, one or more of the following: dimethyl carbonate, ethyl methyl carbonate, diethyl carbonate (DEC), methyl n-propyl carbonate, ethyl n-propyl carbonate, di-n-propyl carbonate and other chained carbonate, as chained carbonate substituted with fluorine, for example, bis(fluoromethyl)carbonate, bis(difluoromethyl)carbonate, bis(trifluoromethyl)carbonate, bis(2-fluoroethyl)carbonate, bis(2,2-difluoroethyl)carbonate, bis(2,2,2-trifluoroethyl)carbonate, 2-fluoroethyl methyl carbonate, 2,2-difluoroethyl methyl carbonate and 2,2,2-trifluoroethyl methyl carbonate.

In some embodiments, the cyclic carboxylate includes, but is not limited to, one or more of γ-butyrolactone and γ-valerolactone. In some embodiments, a portion of the hydrogen atoms of the cyclic carboxylate can be substituted with fluorine.

In some embodiments, the chained carboxylate includes, but is not limited to, one or more of the following: methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate and ethyl pivalate. In some embodiments, a portion of the hydrogen atoms of the chained carboxylate can be substituted with fluorine. In some embodiments, the fluorine-substituted chained carboxylate, includes, but is not limited to, methyl trifluoroacetate, ethyl trifluoroacetate, propyl trifluoroacetate, butyl trifluoroacetate and 2,2,2-trifluoroethyl trifluoroacetate.

In some embodiments, the cyclic ether includes, but is not limited to, one or more of the following: tetrahydrofuran, 2-methyltetrahydrofuran, 1,3-dioxolane, 2-methyl-1,3-dioxolane, 4-methyl-1,3-dioxolane, 1,3-dioxane, 1,4-dioxane and dimethoxypropane.

In some embodiments, the chained ether includes, but is not limited to, one or more of the following: dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane and 1,2-ethoxymethoxyethane.

In some embodiments, the phosphorus-containing organic solvent includes, but is not limited to, one or more of the following: trimethyl phosphate, triethyl phosphate, dimethyl ethyl phosphate, methyl diethyl phosphate, ethidene methyl phosphate, ethidene ethyl phosphate, triphenyl phosphate, trimethyl phosphite, triethyl phosphite, triphenyl phosphite, tris(2,2,2-trifluoroethyl) phosphate and tris(2,2,3,3,3-pentafluoropropyl) phosphate.

In some embodiments, the sulfur-containing organic solvent includes, but is not limited to, one or more of the following: sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate and dibutyl sulfate. In some embodiments, a portion of the hydrogen atoms of the sulfur-containing organic solvent can be substituted with fluorine.

In some embodiments, the aromatic fluorine-containing solvent includes, but is not limited to, one or more of the following: fluorobenzene, difluorobenzene, trifluorobenzene, tetrafluorobenzene, pentafluorobenzene, hexafluorobenzene and trifluoromethylbenzene.

In some embodiments, the solvent used in the electrolytic solution of this application includes cyclic carbonate, chained carbonate, cyclic carboxylate, chained carboxylate and combinations thereof. In some embodiments, the solvent used in the electrolytic solution of this application includes an organic solvent selected from the group consisting of ethylene carbonate, propylene carbonate, diethyl carbonate, ethyl propionate, propyl propionate, n-propyl acetate, ethyl acetate and combinations thereof. In some embodiments, the solvent used in the electrolytic solution of this application includes ethylene carbonate, propylene carbonate, diethyl carbonate, ethyl propionate, propyl propionate, γ-butyrolactone and combinations thereof.

After the chained carboxylate and/or the cyclic carboxylate are added to the electrolytic solution, the chained carboxylate and/or the cyclic carboxylate can form a passivation film on the surface of the electrode, thereby improving the capacity retention rate after the intermittent charging cycle of the electrochemical device. In some embodiments, the electrolytic solution contains about 1 wt %-about 60 wt % of chained carboxylate, cyclic carboxylate and combinations thereof. In some embodiments, the electrolytic solution contains about 1 wt %-about 60 wt %, about 10 wt %-about 60 wt %, about 10 wt %-about 50 wt % or about 20 wt %-about 50 wt % of ethyl propionate, propyl propionate, γ-butyrolactone and combinations thereof. In some embodiments, the electrolytic solution contains about 1 wt %-about 60 wt %, about 10 wt %-about 60 wt %, about 20 wt %-about 50 wt %, about 20 wt %-about 40 wt % or about 30 wt % of propyl propionate.

(2) Additive

In some embodiments, the additive includes, but is not limited to, one or more of the following: fluorocarbonate, carbon-carbon double bond-containing ethylene carbonate, a sulfur-oxygen double bond-containing compound, a compound having 2-4 cyano groups, and acid anhydrides.

In some embodiments, the content of the additive is about 0.01%-about 15% based on the total weight of the electrolytic solution. In some embodiments, the content of the additive is about 0.1%-about 10% based on the total weight of the electrolytic solution. In some embodiments, the content of the additive is about 1%-about 5% based on the total weight of the electrolytic solution.

According to the embodiments of this application, the content of the propionate is about 1.5-about 30 times the additive based on the total weight of the electrolytic solution. In some embodiments, the content of the propionate is about 1.5-about 20 times the additive based on the total weight of the electrolytic solution. In some embodiments, the content of the propionate is about 2-about 20 times the additive based on the total weight of the electrolytic solution. In some embodiments, the content of the propionate is about 5-about 20 times the additive based on the total weight of the electrolytic solution.

Fluorocarbonate

In some embodiments, the additive includes one or more fluorocarbonate. When the lithium-ion battery is charged/discharged, the fluorocarbonate can act together with the propionate to form a stable protective film on the surface of the anode, thereby suppressing the decomposition reaction of the electrolytic solution.

In some embodiments, the fluorocarbonate has the formula $C=O(OR_1)(OR_2)$, where $R_1$ and $R_2$ are each selected from alkyl or haloalkyl having 1-6 carbon atoms, where at least one of $R_1$ and $R_2$ is selected from fluoroalkyl having 1-6 carbon atoms, and $R_1$ and $R_2$ optionally form a 5- to 7-membered ring along with the atoms to which they are connected.

In some embodiments, the fluorocarbonate includes, but is not limited to, one or more of the following: fluoroethylene carbonate, cis 4,4-difluoroethylene carbonate, trans 4,4-difluoroethylene carbonate, 4,5-difluoroethylene carbonate, 4-fluoro-4-methylethylene carbonate, 4-fluoro-5-methylethylene carbonate, methyl trifluoromethyl carbonate, methyl trifluoroethyl carbonate and ethyl trifluoroethyl carbonate.

Carbon-Carbon Double Bond-Containing Ethylene Carbonate

In some embodiments, the carbon-carbon double bond-containing ethylene carbonate includes, but is not limited to, one or more of the following: vinylene carbonate, methyl vinylene carbonate, ethyl vinylene carbonate, 1,2-dimethylvinylene carbonate, 1,2-diethylvinylene carbonate, fluorovinylene carbonate, trifluoromethyl vinylene carbonate; vinyl ethylene carbonate, 1-methyl-2-vinylethylene carbonate, 1-ethyl-2-vinylethylene carbonate, 1-n-propyl-2-vinylethylene carbonate, 1-methyl-2-vinylethylene carbonate, 1,1-divinylethylene carbonate, 1,2-divinylethylene carbonate, 1,1-dimethyl-2-methylene ethylene carbonate and 1,1-diethyl-2-methylene ethylene carbonate. In some embodiments, the carbon-carbon double bond-containing carbonate includes vinylene carbonate, which is easy to obtain and can achieve a more excellent effect.

Sulfur-Oxygen Double Bond-Containing Compound

In some embodiments, the sulfur-oxygen double bond-containing compound includes, but is not limited to, one or more of the following: cyclic sulfate, chained sulfate, chained sulfonate, cyclic sulfonate, chained sulfite and cyclic sulfite.

In some embodiments, the cyclic sulfate includes, but is not limited to, one or more of the following: 1,2-ethanediol sulfate, 1,2-propanediol sulfate, 1,3-propanediol sulfate, 1,2-butanediol sulfate, 1,3-butanediol sulfate, 1,4-butanediol sulfate, 1,2-pentanediol sulfate, 1,3-pentanediol sulfate, 1,4-pentanediol sulfate and 1,5-pentanediol sulfate.

In some embodiments, the chained sulfate includes, but is not limited to, one or more of the following: dimethyl sulfate, ethyl methyl sulfate and diethyl sulfate.

In some embodiments, the chained sulfonate includes, but is not limited to, one or more of the following: fluorosulfonate such as methyl fluorosulfonate and ethyl fluorosulfonate, methyl methanesulfonate, ethyl methanesulfonate, butyl dimethanesulfonate, methyl 2-(methylsulfonyloxy)propionate and ethyl 2-(methylsulfonyloxy)propionate.

In some embodiments, the cyclic sulfonate includes, but is not limited to, one or more of the following: 1,3-propane sultone, 1-fluoro-1,3-propane sultone, 2-fluoro-1,3-propane sultone, 3-fluoro-1,3-propane sultone, 1-methyl-1,3-propane sultone, 2-methyl-1,3-propane sultone, 3-methyl-1,3-propane sultone, 1-propene-1,3-sultone, 2-propene-1,3-sultone, 1-fluoro-1-propene-1,3-sulfonate, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butane sultone, 1,5-pentane sultone, methylene methanedisulfonate and ethylene methanedisulfonate.

In some embodiments, the chained sulfite includes, but is not limited to, one or more of the following: dimethyl sulfite, ethyl methyl sulfite and diethyl sulfite.

In some embodiments, the cyclic sulfite includes, but is not limited to, one or more of the following: 1,2-ethanediol sulfite, 1,2-propanediol sulfite, 1,3-propanediol sulfite, 1,2-butanediol sulfite, 1,3-butanediol sulfite, 1,4-butanediol sulfite, 1,2-pentanediol sulfite, 1,3-pentanediol sulfite, 1,4-pentanediol sulfite and 1,5-pentanediol sulfite.

Compound Having 2-4 Cyano Groups

In some embodiments, the compound having 2-4 cyano groups includes, but is not limited to, one or more of a dinitrile compound, a trinitrile compound and a tetranitrile compound.

In some embodiments, the compound having 2-4 cyano groups includes, but is not limited to, one or more of the following: succinonitrile, glutaronitrile, adiponitrile, 1,5-dicyanopentane, 1,6-dicyanohexane, tetramethyl succinonitrile, 2-methylglutaronitrile, 2,4-dimethylglutaronitrile, 2,2,4,4-tetramethylglutaronitrile, 1,4-dicyanopentane, 1,4-dicyanopentane, 1,2-dicyanobenzene, 1,3-dicyanobenzene, 1,4-dicyanobenzene, ethylene glycol bis(propionitrile)ether, 3,5-dioxa-pimelonitrile, 1,4-bis(cyanoethoxy)butane, diethylene glycol bis(2-cyanoethyl) ether, triethylene glycol bis(2-cyanoethyl) ether, tetraethylene glycol bis(2-cyanoethyl) ether, 1,3-bis(2-cyanoethoxy)propane, 1,4-bis(2-cyanoethoxy)butane, 1,5-bis(2-cyanoethoxy)pentane, ethylene glycol bis(4-cyanobutyl) ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane and 1,2,5-tris(cyanoethoxy)pentane.

Acid Anhydride

In some embodiments, the acid anhydride includes, but is not limited to, one or more of cyclic phosphoric anhydride, carboxylic anhydride, disulfonic anhydride and carboxylic sulfonic anhydride. In some embodiments, the cyclic phosphoric anhydride includes, but is not limited to, one or more of trimethylphosphoric acid cyclic anhydride, triethylphosphoric acid cyclic anhydride and tripropylphosphoric acid cyclic anhydride. In some embodiments, the carboxylic anhydride includes, but is not limited to, one or more of succinic anhydride, glutaric anhydride and maleic anhydride. In some embodiments, the disulfonic anhydride includes, but is not limited to, one or more of ethane disulfonic anhydride and propane disulfonic anhydride. In some embodiments, the carboxylic sulfonic anhydride includes, but is not limited to, one or more of sulfobenzoic anhydride, sulfopropionic anhydride and sulfobutyric anhydride.

In some embodiments, the additive is a combination of fluorocarbonate and carbon-carbon double bond-containing ethylene carbonate. In some embodiments, the additive is a combination of fluorocarbonate and a sulfur-oxygen double bond-containing compound. In some embodiments, the additive is a combination of fluorocarbonate and a compound having 2-4 cyano groups. In some embodiments, the additive is a combination of fluorocarbonate and cyclic carboxylate. In some embodiments, the additive is a combination of fluorocarbonate and cyclic phosphoric anhydride. In some embodiments, the additive is a combination of fluorocarbonate and carboxylic anhydride. In some embodiments, the additive is a combination of fluorocarbonate and sulfonic anhydride. In some embodiments, the additive is a combination of fluorocarbonate and carboxylic sulfonic anhydride.

(3) Electrolyte

The electrolyte used in the electrolytic solution of this application is not limited, and may be any electrolyte known in the prior art. In some embodiments, the electrolyte includes, but is not limited to, one or more of the following: inorganic lithium salts, such as $LiClO_4$, $LiAsF_6$, $LiPF_6$, $LiBF_4$, $LiSbF_6$, $LiSO_3F$, $LiN(FSO_2)_2$, etc.; fluorine-containing organic lithium salts, such as $LiCF_3SO_3$, $LiN(FSO_2)(CF_3SO_2)$, $LiN(CF_3SO_2)_2$, $LiN(C_2F_5SO_2)_2$, cyclic lithium 1,3-hexafluoropropane disulfonimide, cyclic lithium 1,2-tetrafluoroethanedisulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, $LiBF_2(C_2F_5SO_2)_2$, etc.; and dicarboxylic acid complex-containing lithium salts, such as lithium bis(oxalate)borate, lithium difluoro(oxalate)borate, lithium tris(oxalate)phosphate, lithium difluorobis(oxalate)phosphate, lithium tetrafluoro(oxalate)phosphate, etc. In some embodiments, the electrolyte includes $LiPF_6$ and $LiBF_4$. In some embodiments, the electrolyte includes a combination of an inorganic lithium salt such as $LiPF_6$, $LiBF_4$ or the like and a fluorine-containing organic lithium salt such as $LiCF_3SO_3$, $LiN(CF_3SO_2)_2$, $LiN(C_2F_5SO_2)_2$ or the like.

In some embodiments, the concentration of the electrolyte is in the range of about 0.8-about 3 mol/L, such as in the range of about 0.8-about 2.5 mol/L, in the range of about 0.8-about 2 mol/L or in the range of about 1-about 2 mol/L, and for example, about 1 mol/L, about 1.15 mol/L, about 1.2 mol/L, about 1.5 mol/L, about 2 mol/L or about 2.5 mol/L.

3. Cathode

The cathode of this application includes a cathode current collector and a cathode active material layer disposed on one or two surfaces of the cathode current collector.

The cathode current collector includes a cathode conductive material. In some embodiments, the cathode current collector includes, but is not limited to, aluminum, nickel and stainless steel.

The cathode active material layer contains a cathode active material and a cathode adhesive. The cathode active material layer may be one or more layers. Each of the plurality of the cathode active material layers may include the same or different cathode active materials. The cathode active material is any material capable of deintercalating metal ions such as lithium ions.

In some embodiments, the cathode active material is a lithium-containing compound that provides a high energy density to an electrochemical device. In some embodiments, the lithium-containing compound includes one or more of a lithium transition metal composite oxide and a lithium transition metal phosphate compound. In some embodiments, the lithium transition metal composite oxide includes lithium and an oxide having one or more transition metal elements. In some embodiments, the lithium transition metal phosphate compound is a phosphate compound including lithium and having one or more transition metal elements. In some embodiments, the transition metal element includes one or more of Co, Ni, Mn and Fe that can result in a higher voltage for the electrochemical device. In some embodiments, the lithium-containing compound has the chemical formula $Li_xM_1O_2$ or $Li_yM_2PO_4$, where $M_1$ and $M_2$ represent one or more transition metal elements, and values of x and y vary with charge/discharge state, and are generally within the following ranges: $0.05 \leq x \leq 1.10$ and $0.05 \leq y \leq 1.10$.

In some embodiments, the lithium transition metal composite oxide includes, but is not limited to, $LiCoO_2$, $LiNiO_2$, and a lithium nickel based transition metal composite oxide represented by the formula $LiNi_{1-z}M_zO_2$, where M is selected from one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb and Nb, and z satisfies the range of $0.005 < z < 0.5$.

In some embodiments, the lithium transition metal phosphate compound includes, but is not limited to, $LiFePO_4$ and a compound represented by the formula $LiFe_{1-u}Mn_uPO_4$, where $u<1$. By using these compounds as active materials of the cathode, the obtained electrochemical device has high battery capacity and excellent cycle performance.

In some embodiments, the cathode active material further includes one or more of an oxide, a disulfide, a chalcogenide and a conductive polymer. In some embodiments, the oxide includes, but is not limited to, titanium dioxide, vanadium oxide and manganese dioxide. In some embodiments, the disulfide includes, but is not limited to, titanium disulfide and molybdenum disulfide. In some embodiments, the chalcogenide includes, but is not limited to, niobium selenide. In some embodiments, the conductive polymer includes, but is not limited to, sulfur, polyaniline and polythiophene.

In some embodiments, the cathode adhesive includes, but is not limited to, one or more of synthetic rubber and polymeric materials. In some embodiments, the synthetic rubber includes, but is not limited to, styrene-butadiene rubber, fluororubber, and ethylene propylene diene. In some embodiments, the polymeric material includes, but is not limited to, polyvinylidene fluoride and polyimide.

In some embodiments, the cathode active material layer further includes other materials, for example, a cathode conductive agent. In some embodiments, the cathode conductive agent includes one or more of a conductive metal material and a conductive polymer. In some embodiments, the cathode conductive agent includes one or more of a carbon material or the like. In some embodiments, the carbon material includes, but is not limited to, graphite, carbon black, acetylene black and Ketjen black.

3. Separator

In some embodiments, a separator is provided between the cathode and the anode of the electrochemical device of this application to prevent current short circuit caused by contact of the two electrode sheets while allowing lithium ions to pass.

The material and shape of the separator used in the electrochemical device of this application are not particularly limited, and may be any of the techniques disclosed in the prior art. In some embodiments, the separator includes a polymer (e.g., a synthetic resin) or an inorganic material (e.g., ceramic) or the like formed of a material that is stable to the electrolytic solution of this application. In some embodiments, the separator includes a porous film made of the polymer or the inorganic material. In some embodiments, the separator includes a laminate film that laminates two or more porous films. In some embodiments, the polymer includes, but is not limited to, polytetrafluoroethylene, polypropylene and polyethylene.

In some embodiments, the separator includes the above porous film (base material layer) and a high-molecular compound layer disposed on one or two surfaces of the base material layer, which can improve the adhesion of the separator to the cathode and the anode and suppress the deflection when the electrode sheet is wound, thereby suppressing the decomposition reaction of the electrolytic solution and suppressing the liquid leakage of the electrolytic solution impregnated into the base material layer. By using such a separator, the electrical resistance of the electrochemical device is not significantly increased even in the case of repeated charging/discharging, thereby suppressing the expansion of the electrochemical device.

In some embodiments, the high-molecular compound layer includes, but is not limited to, polyvinylidene fluoride. The polyvinylidene fluoride has excellent physical strength and electrochemical stability. The high-molecular compound layer can be formed by the following method: after a solution in which the high-molecular material is dissolved is prepared, a base material layer is coated with the solution or immersed in the solution, and finally drying is performed.

III. Application

The electrochemical device of this application includes any device that generates an electrochemical reaction, and its specific examples include all kinds of primary batteries, secondary batteries, fuel cells, solar cells or capacitors. In particular, the electrochemical device is a lithium secondary battery, including a lithium metal secondary battery, a lithium-ion secondary battery, a lithium polymer secondary battery or a lithium ion polymer secondary battery.

The use of the electrochemical device of this application is not particularly limited and can be used for any use known in the prior art. In one embodiment, the electrochemical device of this application can be used for, but not limited to, notebook computers, pen input computers, mobile computers, e-book players, portable telephones, portable fax machines, portable copy machines, portable printers, headset stereo headphones, VCRs, LCD TVs, portable cleaners, portable CD players, mini disc players, transceivers, electronic notebooks, calculators, memory cards, portable recorders, radios, backup power devices, motors, cars, motorcycles, power bicycles, bicycles, lighting fixtures, toys, game consoles, clocks, power tools, flashlights, cameras, large household batteries, lithium ion capacitors, and the like.

EXAMPLES

The following describes examples of the lithium ion battery according to this application and comparative examples for performance evaluation.

1. Preparation of Lithium-Ion Battery (1) Preparation of Anode

The anode active material, the styrene-butadiene rubber, and the adhesive were mixed in a mass ratio of 95:2:2:1 with deionized water, and stirred uniformly to obtain an anode slurry. 12 μm copper foil was coated with the anode slurry, dried, cold-pressed, and then subjected to slice cutting and tab welding to obtain an anode.

(2) Preparation of Cathode

Lithium cobalt oxide ($LiCoO_2$), conductive carbon (Super-P) and polyvinylidene fluoride (PVDF) were mixed in a mass ratio of 95:2:3 with N-methylpyrrolidone (NMP), and stirred uniformly to obtain a cathode slurry. 12 μm aluminum foil was coated with the cathode slurry, dried, cold-pressed, and then subjected to slice cutting and tab welding to obtain a cathode.

(3) Preparation of Electrolytic Solution

Under a dry argon atmosphere, EC, PC and DEC (weight ratio is 1:1:1) were mixed, and $LiPF_6$ was added and mixed uniformly to form a base electrolytic solution, where the concentration of $LiPF_6$ was 1.15 mol/L. Different amounts of propionate and/or additive were added to the base electrolytic solution to obtain electrolytic solutions of different examples/comparative examples.

(4) Preparation of Separator

A polyethylene (PE) porous polymer film was used as a separator.

(5) Preparation of Lithium-Ion Battery

The obtained cathode, anode and separator were wound in order, and placed in outer packaging foil, leaving a liquid injection port. The lithium-ion battery was obtained by injecting the electrolytic solution from the liquid injection port, performing encapsulation, and then performing processes such as formation and capacity.

2. Test Methods (1) Test Method for Capacity Retention Rate after Cycle of Lithium-Ion Battery At 45° C., the lithium-ion battery was charged at a constant current of 1 C to 4.45 V, then charged at a constant voltage to a current of 0.05 C, and discharged at a constant current of 1 C to 3.0 V, which was the first cycle. The lithium-ion battery was cycled several times in accordance with the above conditions. The capacity retention rate after cycle of the lithium-ion battery was calculated by the following formula:

Capacity retention rate after cycle=(discharge capacity of the corresponding number of cycles/discharge capacity of the first cycle)×100%

"1 C" is the current value that completely discharges the battery capacity within 1 hour.

(2) Test Method for Storage Capacity Retention Rate after Cycle of Lithium-Ion Battery After 300 cycles according to Test Method (1), the lithium-ion battery was allowed to stand at 25° C. for 30 minutes, then charged at a constant current of 0.5 C to 4.45 V, charged at a constant voltage of 4.45 V to 0.05 C, and allowed to stand for 5 minutes. After storage at 60° C. for 7 days, the battery was charged at a constant current of 1 C to 4.45 V, then charged at a constant voltage to a current of 0.05 C, and discharged at a constant current of 1 C to 3.0 V, and the discharge capacity was recorded as a storage discharge capacity after cycle. The storage capacity retention rate after cycle of the lithium-ion battery was calculated by the following formula:

Storage capacity retention after cycle=(storage discharge capacity after cycle/discharge capacity of first cycle)×100%.

(3) Test Method for High-Temperature Storage Performance of Lithium-Ion Battery

At 25° C., the lithium-ion battery was allowed to stand for 30 minutes, then charged at a constant current of 0.5 C to 4.45 V, charged at a constant voltage of 4.45 V to 0.05 C, and allowed to stand for 5 minutes, and the thickness was measured. Then, after storage at 60° C. for 21 days, the thickness of the battery was measured. The thickness expansion ratio of the lithium-ion battery was calculated by the following formula:

Thickness expansion ratio=[(thickness after storage-thickness before storage)/thickness before storage]×100%.

(4) Test Method for Low-Temperature Discharge Performance of Lithium-Ion Battery At 25° C., the battery was charged at a constant current of 0.5 C to 4.45 V, charged at a constant voltage to 0.05 C, and then discharged at a constant current of 0.5 C to 3.0 V, and a 25° C. discharge capacity was recorded. At 25° C., the battery was charged at a constant current of 0.5 C to 4.45 V, and charged at a constant voltage to 0.05 C. After that, the battery was placed in a −20° C. incubator, allowed to stand for 2 hours, and then discharged at a constant current of 0.5 C to 3.0 V, and a −20° C. discharge capacity was recorded. The discharge percentage of the lithium-ion battery was calculated by the following formula:

Discharge percentage=[−20° C. discharge capacity/ 25° C. discharge capacity]×100%.

3. Test Results

Tables 1-4 show the composition and performance of the lithium-ion batteries of the examples and the lithium-ion batteries of the comparative examples of this application. The results show that a lithium-ion battery made of an anode including a carbon material (for example, artificial graphite) and hydroxyalkyl methylcellulose (for example, hydroxypropyl methylcellulose sodium) and an electrolytic solution including PP has excellent capacity retention rate after cycle, storage capacity retention rate after cycle, high-temperature storage performance and low-temperature discharge performance.

Table 1 shows the effect of the composition of the anode and electrolytic solution on the performance of the lithium-ion battery.

In the case where the anode includes a carbon material (for example, artificial graphite), the performance of the lithium-ion battery is directly related to the specific surface area of the carbon material, the adhesive of the anode and the composition of the electrolytic solution.

In the case where the anode includes a carbon material (for example, artificial graphite) and hydroxyalkyl methylcellulose (for example, hydroxypropyl methylcellulose sodium), a lithium-ion battery containing PP (for example, Si) in the electrolytic solution has an increased capacity retention rate after cycle, an increased storage capacity retention rate after cycle, a decreased thickness expansion ratio, and an increased discharge percentage than a lithium-ion battery that does not contain PP (for example, D1), which indicates that the lithium-ion battery has improved cycle performance, high-temperature storage performance and low-temperature discharge performance. This is because hydroxyalkyl methylcellulose and PP form a stable protective film on the surface of the anode, so that lithium ions are easily deintercalated, and the reversibility of the electrode reaction is improved.

In the case where the anode includes a carbon material (for example, artificial graphite) and the electrolytic solution includes PP, compared with carboxyalkyl cellulose (for example, D2) and hydroxyalkyl cellulose (for example, D2-D5), the use of hydroxyalkyl methylcellulose (for example, S7, S21 and S22) as an adhesive for the anode can significantly increase the capacity retention rate after cycle and storage capacity retention rate after cycle of the lithium-ion battery, lower the thickness expansion ratio and increase the discharge percentage, thereby improving the cycle performance, high-temperature storage performance and low-temperature discharge performance of the lithium-ion battery.

In the case where the anode includes a carbon material (for example, artificial graphite) and hydroxyalkyl methylcellulose (for example, hydroxypropyl methylcellulose sodium) and the electrolytic solution includes PP, when the specific surface area of the carbon material is less than or equal to 3 $m^2/g$, the capacity retention rate after cycle and the storage capacity retention rate after cycle of the lithium-ion battery are further increased. This is because the protective film formed from the hydroxyalkyl methylcellulose and the propionate on the surface of the anode is more uniform and stable under a particular specific surface area of the carbon material, so that it is not easily decomposed during the cycle. After FEC is is added to the electrolytic solution, a composite protective film can be formed on the surface of the anode, which is more excellent in stability and low-temperature performance, so that the performance of the lithium-ion battery can be further improved.

TABLE 1

| | Anode | | | Electrolytic solution | | | Capacity Retention Rate After Cycle (%) | Storage Capacity Retention Rate After Cycle (%) | Thickness Expansion Ratio (%) | Discharge Percentage (%) |
|---|---|---|---|---|---|---|---|---|---|---|
| | Anode Active Material | | | | Additive | | | | | |
| | Type | Specific Surface Area (m²/g) | Adhesive | Solvent (30 wt %) | Type | Content (wt %) | | | | |
| Example | | | | | | | | | | |
| S1 | Artificial graphite | 1.6 | Hydroxypropyl methylcellulose sodium | PP | — | — | 33 | 35 | 17.6 | 35.2 |
| S2 | | | | PP | FEC | 0.01 | 62 | 61 | 7.8 | 40.9 |
| S3 | | | | | | 0.1 | 65 | 63 | 6.5 | 42.8 |
| S4 | | | | | | 0.5 | 70 | 65 | 5.8 | 43.4 |
| S5 | | | | | | 1 | 75 | 72 | 5.4 | 43.5 |
| S6 | | | | | | 2 | 77 | 78 | 5.3 | 45.1 |
| S7 | | | | | | 5 | 82 | 85 | 5.2 | 47.2 |
| S8 | | | | | | 10 | 74 | 76 | 5.9 | 47.6 |
| S9 | Artificial graphite | 1.6 | Hydroxypropyl methylcellulose sodium | PP | Cis DFEC | 5 | 77 | 75 | 5.6 | 43.5 |
| S10 | | | | | Trans DFEC | | 71 | 70 | 5.3 | 44.3 |
| S11 | | | | | TFEMC | | 72 | 73 | 5.7 | 48.3 |
| S12 | | | | | ETFEC | | 73 | 75 | 5.8 | 42.2 |
| S13 | | 1.8 | | PP | — | — | 52 | 59 | 8.3 | 46.3 |
| S14 | Artificial graphite | | Hydroxypropyl methylcellulose sodium | | FEC | 5 | 81 | 84 | 5.4 | 50.4 |
| S15 | Artificial | 2 | Hydroxypropyl | PP | — | — | 50 | 53 | 8.7 | 51.7 |
| S16 | graphite | | methylcellulose sodium | | FEC | 5 | 77 | 73 | 6.3 | 55 |
| S17 | Artificial | 3 | Hydroxypropyl | PP | — | — | 46 | 47 | 8.9 | 52.3 |
| S18 | graphite | | methylcellulose sodium | | FEC | 5 | 63 | 65 | 6.5 | 57.3 |
| S19 | Artificial | 3.5 | Hydroxypropyl | PP | — | — | 43 | 42 | 9.1 | 53.9 |
| S20 | graphite | | methylcellulose sodium | | FEC | 5 | 61 | 58 | 6.8 | 58.7 |
| S21 | Artificial graphite | 1.6 | Hydroxyethyl methylcellulose sodium | PP | FEC | 5 | 81 | 83 | 5.7 | 41.8 |
| S22 | | 1.6 | Hydroxymethyl methylcellulose sodium | | | | 79 | 81 | 5.9 | 42.7 |
| S23 | | 1.6 | Hydroxypropyl methylcellulose lithium | | | | 84 | 87 | 5.2 | 49.1 |
| S24 | | 1.6 | Hydroxyethyl methylcellulose lithium | | | | 81 | 80 | 5.4 | 44.2 |
| S25 | | 1.6 | Hydroxymethyl methylcellulose lithium | | | | 79 | 78 | 5.3 | 46.9 |
| S26 | Artificial graphite:silica = 95:5 (weight ratio) | 2 | Hydroxypropyl methylcellulose sodium | | | | 70 | 69 | 8.1 | 40.1 |
| S27 | Artificial graphite:silica = 95:5 (weight ratio) | 2 | Hydroxypropyl methylcellulose sodium | | | | 68 | 66 | 8.9 | 38.8 |
| Comparative example | | | | | | | | | | |
| D1 | Artificial graphite | 1.6 | Hydroxypropyl methylcellulose sodium | — | — | — | 31 | 32 | 22.1 | 12.5 |
| D2 | Artificial graphite | 1.6 | Carboxymethylcellulose sodium | PP | FEC | 5 | 42 | 45 | 5.7 | 41 |
| D3 | | 1.6 | Hydroxymethyl cellulose sodium | | | | 43 | 44 | 5.9 | 43.2 |
| D4 | | 1.6 | Hydroxyethyl cellulose sodium | | | | 41 | 40 | 6.1 | 43.4 |
| D5 | | 1.6 | Hydroxypropyl cellulose sodium | | | | 40 | 42 | 6.4 | 39.5 |
| D6 | Artificial graphite:silica = 95:5 (weight ratio) | 2 | Carboxymethylcellulose sodium | | | | 41 | 42 | 12.7 | 33.6 |
| D7 | Artificial graphite | 1.6 | Carboxymethylcellulose sodium | — | — | — | 28 | 29 | 12.3 | 8.5 |
| D8 | Artificial graphite | 1.6 | Carboxymethylcellulose sodium | PP | — | — | 29 | 30 | 23.5 | 30.6 |
| D9 | Artificial graphite | 1.8 | Carboxymethylcellulose sodium | PP | FEC | 5 | 44 | 47 | 5.8 | 45.3 |

Table 2 shows the effect of the solvent composition in the electrolytic solution on the performance of a lithium-ion battery.

It can be seen from S28-S33 that even if the content of PP in the electrolytic solution changes to some extent, the lithium-ion battery can still obtain good capacity retention rate after cycle, storage capacity retention rate after cycle, high-temperature storage performance and low-temperature discharge performance, and particularly the improvement of the low-temperature discharge performance of the lithium-ion battery is especially remarkable. When the content of PP in the electrolytic solution is in the range of about 10 wt %-50 wt %, the performance of the lithium-ion battery is particularly excellent. This is because within this content range, the protective film formed by hydroxyalkyl methylcellulose and PP is more stable, the film impedance is lower, and the passage of lithium ions is facilitated, thereby improving the dynamic performance of the lithium-ion battery.

When the electrolytic solution includes the additive FEC, during the charging/discharging process of the lithium-ion battery, FEC and PP act together on the surface of the anode to form a stable protective film, thereby suppressing the decomposition reaction of the electrolytic solution, which contributes to the increase of the capacity retention rate after cycle and storage capacity retention rate after cycle of the lithium-ion battery. The content of FEC in the electrolytic solution is not particularly limited, and is, in some embodiments, 0.01 wt %-15 wt %. When the content of PP in the electrolytic solution is 3-10 times that of FEC, the performance of the lithium-ion battery is more excellent.

In addition, an additional solvent (for example, EP or GBL) may be included in the electrolytic solution to help improve the capacity retention rate after cycle, storage capacity retention rate after cycle and low-temperature discharge performance of the lithium-ion battery.

TABLE 2

| | Anode | | | Electrolytic solution | | | | Storage | | | |
|---|---|---|---|---|---|---|---|---|---|---|---|
| | Anode Active Material | | | Solvent | | Additive | | Capacity Retention | Capacity Retention | | |
| Example | Type | Specific Surface Area ($m^2/g$) | Adhesive | PP (wt %) | Other (wt %) | Type | Content (wt %) | Rate After Cycle (%) | Rate After Cycle (%) | Thickness Expansion Ratio (%) | Discharge Percentage (%) |
| S28 | Artificial graphite | 1.6 | Hydroxypropyl methylcellulose sodium | 10 | — | FEC | 5 | 73 | 76 | 4.8 | 22.3 |
| S29 | | | | 15 | | | | 75 | 77 | 4.9 | 35.3 |
| S30 | | | | 20 | | | | 77 | 79 | 5 | 36.5 |
| S31 | | | | 30 | | | | 82 | 85 | 5.2 | 47.2 |
| S32 | | | | 40 | | | | 85 | 86 | 5.9 | 52.9 |
| S33 | | | | 50 | | | | 83 | 81 | 6.3 | 59.4 |
| S34 | Artificial graphite | 1.6 | Hydroxypropyl methylcellulose lithium | 30 | 10 vol % EP | FEC | 5 | 91 | 90 | 5 | 53.2 |
| S35 | | | Hydroxyethyl methylcellulose lithium | | | | | 85 | 81 | 5.1 | 51.1 |
| S36 | | | Hydroxypropyl methylcellulose sodium | | 20 vol % EP | | | 83 | 84 | 5.8 | 58.8 |
| S37 | | | | | 5 vol % GBL | | | 85 | 93 | 5.7 | 56.4 |

Table 3 shows the effects of the solute composition in the electrolytic solution on the performance of a lithium-ion battery.

In Examples S38-S55, in addition to LiPF$_6$, the electrolytic solution further includes other lithium salts as electrolytes, for example, LiBF$_4$, LiPO$_2$F$_2$ and LiFSI. The results show that the addition of additional electrolyte to the electrolytic solution can improve the capacity retention rate after cycle, storage capacity retention rate after cycle, high-temperature storage performance and low-temperature discharge performance of the lithium-ion battery. The content of the other lithium salts in the electrolytic solution is not particularly limited. In some embodiments, the content of other lithium salts is in the range of 0.01 wt %-0.1 wt % based on the total weight of the electrolytic solution. Within this range, other lithium salts can act synergistically with PP and hydroxyalkyl methylcellulose to form a strong composite protective film, thereby stabilizing the interface and suppressing the reaction between the electrolytic solution and the cathode/anode active material.

TABLE 3

| | Anode | | | Electrolytic solution | | |
|---|---|---|---|---|---|---|
| | Anode Active Material | | | | Other lithium salts other than LiPF$_6$ | |
| Example | Type | Specific Surface Area (m$^2$/g) | Adhesive | Solvent | Type | Content (wt %) |
| S7 | Artificial graphite | 1.6 | Hydroxypropyl methylcellulose sodium | 30 wt % PP | — | — |
| S38 | Artificial graphite | 1.6 | Hydroxypropyl methylcellulose sodium | 30 wt % PP | LiBF$_4$ | 0.01 |
| S39 | | | | | | 0.05 |
| S40 | | | | | | 0.1 |
| S41 | | | | | LiPO$_2$F$_2$ | 0.01 |
| S42 | | | | | | 0.05 |
| S43 | | | | | | 0.1 |
| S44 | | | | | LiFSI | 0.01 |
| S45 | | | | | | 0.05 |
| S46 | | | | | | 0.1 |
| S47 | | | | 30 wt % PP + 20 wt % EP | LiBF$_4$ | 0.01 |
| S48 | | | | | | 0.05 |
| S49 | | | | | | 0.1 |
| S50 | Artificial graphite | 1.6 | Hydroxypropyl methylcellulose lithium | 30 wt % PP + 20 wt % EP | LiBF$_4$ | 0.01 |
| S51 | | | | | | 0.05 |
| S52 | | | | | | 0.1 |
| S53 | Artificial graphite:silica = 95:5 (weight ratio) | 2 | | | LiBF$_4$ | 0.01 |
| S54 | | | | | | 0.05 |
| S55 | | | | | | 0.1 |

| | Electrolytic solution Additive | | Capacity Retention | Storage Capacity Retention | Thickness Expansion | Discharge |
|---|---|---|---|---|---|---|
| Example | Type | Content (wt %) | Rate After Cycle (%) | Rate After Cycle (%) | Ratio (%) | Percentage (%) |
| S7 | FEC | 5 | 82 | 85 | 5.2 | 47.2 |
| S38 | FEC | 5 | 83 | 86 | 5.3 | 48.4 |
| S39 | | | 85 | 87 | 5.2 | 51.1 |
| S40 | | | 86 | 88 | 5.1 | 55.6 |
| S41 | FEC | 5 | 86 | 88 | 5.2 | 47.1 |
| S42 | | | 88 | 87 | 5.1 | 46.6 |
| S43 | | | 87 | 86 | 4.9 | 44.7 |
| S44 | FEC | 5 | 83 | 82 | 5.3 | 49.9 |
| S45 | | | 84 | 85 | 5.2 | 50.7 |
| S46 | | | 86 | 87 | 5.1 | 51.2 |
| S47 | FEC | 5 | 84 | 83 | 5.6 | 51.5 |
| S48 | | | 87 | 84 | 5.5 | 54.1 |
| S49 | | | 88 | 85 | 5.4 | 58.9 |
| S50 | FEC | 5 | 86 | 85 | 5.6 | 54.7 |
| S51 | | | 90 | 88 | 5.5 | 57.3 |
| S52 | | | 91 | 80 | 5.4 | 62.1 |
| S53 | FEC | 5 | 61 | 70 | 7.9 | 51.3 |
| S54 | | | 63 | 71 | 7.5 | 52.2 |
| S55 | | | 64 | 73 | 7.4 | 52.6 |

Table 4 shows the effect of the composition of the additive in the electrolytic solution on the performance of a lithium-ion battery.

As shown in Examples S56-S118, one or more of the following additives may be included in the electrolytic solution: FEC, PS, DTD, VC, SN, ADN, EDN, HTCN, TCEP, T3P, SCAH and PSAH. The obtained lithium-ion battery has good capacity retention rate after cycle, storage capacity retention rate after cycle, high-temperature storage performance and low-temperature discharge performance.

When the electrolytic solution includes two or more kinds of additives, the capacity retention rate after cycle and the storage capacity retention rate after cycle of the lithium-ion battery are further improved.

TABLE 4

| | Anode | | | Electrolytic solution | | | | |
|---|---|---|---|---|---|---|---|---|
| | Anode Active Material | | | | | Other lithium salts | | Additive |
| Example | Type | Specific Surface Area ($m^2/g$) | Adhesive | Solvent (wt %) | | Type | Content (wt %) | Additive 1 | Content (wt %) |
| S1 | Artificial graphite | 1.6 | Hydroxypropyl methylcellulose sodium | 30 wt % PP | | — | — | — | — |
| S7 | Artificial graphite | 1.6 | Hydroxypropyl methylcellulose sodium | 30 wt % PP | | — | — | FEC | 5 |
| S56 | Artificial graphite | 1.6 | Hydroxypropyl methylcellulose lithium | 30 wt % PP | | — | — | — | — |
| S57 | Artificial graphite | 1.6 | Hydroxypropyl methylcellulose sodium | 30 wt % PP | | — | — | FEC | 5 |
| S58 | | | | | | $LiBF_4$ | 0.1 | | |
| S59 | | | | | | $LiPO_2F_2$ | 0.1 | | |
| S60 | | | | | | — | — | | |
| S61 | | | | | | $LiBF_4$ | 0.1 | | |
| S62 | | | | | | $LiPO_2F_2$ | 0.1 | | |
| S63 | | | | | | — | — | | |
| S64 | | | | | | $LiBF_4$ | 0.1 | | |
| S65 | | | | | | $LiPO_2F_2$ | 0.1 | | |
| S66 | | | | | | — | — | | |
| S67 | | | | | | $LiBF_4$ | 0.1 | | |
| S68 | | | | | | $LiPO_2F_2$ | 0.1 | | |
| S69 | | | | | | — | — | | |
| S70 | | | | | | $LiBF_4$ | 0.1 | | |
| S71 | | | | | | $LiPO_2F_2$ | 0.1 | | |
| S72 | | | | | | — | — | | |
| S73 | | | | | | $LiBF_4$ | 0.1 | | |
| S74 | | | | | | $LiPO_2F_2$ | 0.1 | | |
| S75 | | | | | | — | — | | |
| S76 | | | | | | $LiBF_4$ | 0.1 | | |
| S77 | | | | | | $LiPO_2F_2$ | 0.1 | | |
| S78 | | | | | | — | — | | |
| S79 | | | | | | $LiBF_4$ | 0.1 | | |
| S80 | | | | | | $LiPO_2F_2$ | 0.1 | | |
| S81 | Artificial graphite | 1.6 | Hydroxypropyl methylcellulose lithium | 30 wt % PP | | — | — | FEC | 5 |
| S82 | | | | | | | | | |
| S83 | | | | | | | | | |
| S84 | | | | | | | | | |
| S85 | | | | | | | | | |
| S86 | | | | | | | | | |
| S87 | | | | | | | | | |
| S88 | | | | | | | | | |
| S89 | Artificial graphite | 1.6 | Hydroxypropyl methylcellulose lithium | 30 wt % PP + 20 wt % EP | | — | — | FEC | 5 |
| S90 | | | | | | | | | |
| S91 | | | | | | | | | |
| S92 | | | | | | | | | |
| S93 | | | | | | | | | |
| S94 | | | | | | | | | |
| S95 | | | | | | | | | |
| S96 | | | | | | | | | |
| S97 | Artificial graphite | 1.6 | Hydroxypropyl methylcellulose lithium | 30 wt % PP | | — | — | FEC | 5 |
| S98 | | | | | | | | | |
| S99 | | | | | | | | | |
| S100 | | | | | | | | | |
| S101 | | | | | | | | | |
| S102 | | | | | | | | | |
| S103 | | | | | | | | | |
| S104 | Artificial graphite | 1.6 | Hydroxypropyl methylcellulose sodium | 30 wt % PP | | — | — | FEC | 5 |
| S105 | | | | | | | | | |
| S106 | | | | | | | | | |
| S107 | | | | | | 30 wt % PP + 20 wt % EP | | — | — | FEC | 5 |
| S108 | | | | | | | | | |
| S109 | | | | | | | | | |

TABLE 4-continued

| | | | | | | | | |
|---|---|---|---|---|---|---|---|---|
| S110 | Artificial graphite | 1.6 | Hydroxypropyl methylcellulose lithium | 30 wt % PP | — | — | FEC | 5 |
| S111 | | | | | | | | |
| S112 | | | | | | | | |
| S113 | | | | 30 wt % PP + 20 wt % EP | — | — | FEC | 5 |
| S114 | | | | | | | | |
| S115 | | | | | | | | |
| S116 | Artificial graphite | 1.6 | Hydroxypropyl methylcellulose lithium | 30 wt % PP | — | — | FEC | 5 |
| S117 | Artificial graphite | 1.6 | Hydroxypropyl methylcellulose lithium | 30 wt % PP | — | — | FEC | 5 |
| S118 | Artificial graphite | 1.6 | Hydroxypropyl methylcellulose lithium | 30 wt % PP | — | — | — | — |

| | Electrolytic solution Additive | | | | Capacity Retention Rate After | Storage Capacity Retention Rate After | Thickness | Discharge |
|---|---|---|---|---|---|---|---|---|
| Example | Additive 2 | Content (wt %) | Additive 3 | Content (wt %) | Cycle (%) | Cycle (%) | Expansion Ratio (%) | Percentage (%) |
| S1 | — | — | — | — | 33 | 35 | 17.6 | 35.2 |
| S7 | — | — | — | — | 82 | 85 | 5.2 | 47.2 |
| S56 | PS | 2 | — | — | 73 | 74 | 7.2 | 15.1 |
| S57 | PS | 2 | — | — | 87 | 86 | 5.5 | 48.1 |
| S58 | | | | | 88 | 89 | 5.3 | 49.5 |
| S59 | | | | | 86 | 87 | 5.1 | 50.3 |
| S60 | DTD | 2 | — | — | 89 | 90 | 5.8 | 49.3 |
| S61 | | | | | 90 | 91 | 5.4 | 50.7 |
| S62 | | | | | 91 | 90 | 5.2 | 51.5 |
| S63 | VC | 0.5 | — | — | 88 | 89 | 5.3 | 47 |
| S64 | | | | | 86 | 85 | 5.1 | 46.4 |
| S65 | | | | | 87 | 88 | 4.9 | 45.2 |
| S66 | SN | 4 | — | — | 89 | 90 | 4.8 | 39.7 |
| S67 | | | | | 90 | 91 | 4.3 | 41.1 |
| S68 | | | | | 91 | 92 | 5 | 41.9 |
| S69 | ADN | 5 | — | — | 89 | 90 | 5.2 | 38.3 |
| S70 | | | | | 88 | 89 | 5.1 | 39.7 |
| S71 | | | | | 90 | 91 | 5.6 | 40.5 |
| S72 | EDN | 1 | — | — | 88 | 87 | 5.3 | 42.5 |
| S73 | | | | | 88 | 89 | 5.8 | 43.9 |
| S74 | | | | | 90 | 91 | 5.5 | 44.7 |
| S75 | HTCN | 2 | — | — | 89 | 90 | 5.9 | 38.5 |
| S76 | | | | | 90 | 91 | 5.5 | 39.9 |
| S77 | | | | | 91 | 92 | 5.9 | 40.8 |
| S78 | TCEP | 2 | — | — | 92 | 90 | 5.2 | 42.9 |
| S79 | | | | | 93 | 92 | 5.8 | 43.6 |
| S80 | | | | | 89 | 90 | 5.9 | 44.5 |
| S81 | PS | 2 | — | — | 90 | 89 | 5.6 | 53.2 |
| S82 | DTD | 2 | — | — | 88 | 87 | 5.9 | 55.9 |
| S83 | VC | 0.5 | — | — | 89 | 87 | 5.3 | 49.8 |
| S84 | SN | 4 | — | — | 86 | 85 | 5.5 | 43.9 |
| S85 | ADN | 5 | — | — | 89 | 91 | 5.4 | 44.1 |
| S86 | EDN | 1 | — | — | 90 | 91 | 5.8 | 48.5 |
| S87 | HTCN | 2 | — | — | 91 | 92 | 5.1 | 42 |
| S88 | TCEP | 2 | — | — | 92 | 93 | 5.2 | 48.8 |
| S89 | PS | 2 | — | — | 90 | 91 | 5.7 | 61.6 |
| S90 | DTD | 2 | — | — | 91 | 90 | 6 | 64.3 |
| S91 | VC | 0.5 | — | — | 92 | 89 | 5.4 | 58.2 |
| S92 | SN | 4 | — | — | 89 | 90 | 5.6 | 52.3 |
| S93 | ADN | 5 | — | — | 90 | 90 | 5.5 | 52.5 |
| S94 | EDN | 1 | — | — | 91 | 90 | 5.9 | 56.9 |
| S95 | HTCN | 2 | — | — | 92 | 90 | 5.2 | 50.4 |
| S96 | TCEP | 2 | — | — | 93 | 94 | 5.3 | 57.2 |
| S97 | VC | 0.5 | PS | 3 | 92 | 93 | 5 | 53.2 |
| S98 | PS | 3 | ADN | 3 | 93 | 94 | 5.3 | 53.9 |
| S99 | PS | 3 | EDN | 2 | 94 | 93 | 5.1 | 49.6 |
| S100 | PS | 3 | HTCN | 1 | 93 | 95 | 5.4 | 43.9 |
| S101 | SN | 5 | HTCN | 2 | 94 | 94 | 5.3 | 45.7 |
| S102 | PS | 3 | TCEP | 2 | 95 | 94 | 5.1 | 48.5 |
| S103 | DTD | 0.5 | TCEP | 3 | 94 | 95 | 4.8 | 42.3 |
| S104 | — | — | T3P | 0.5 | 87 | 85 | 4.9 | 53.5 |
| S105 | | | SCAH | 0.5 | 86 | 83 | 5.1 | 52.1 |
| S106 | | | PSAH | 0.5 | 82 | 83 | 5 | 49.6 |
| S107 | — | — | T3P | 0.5 | 88 | 86 | 5.3 | 63.6 |
| S108 | | | SCAH | 0.5 | 85 | 84 | 5.9 | 61.8 |
| S109 | | | PSAH | 0.5 | 83 | 82 | 5.7 | 59.5 |
| S110 | — | — | T3P | 0.5 | 89 | 90 | 5.1 | 58.3 |
| S111 | | | SCAH | 0.5 | 86 | 84 | 5.2 | 56.2 |

TABLE 4-continued

| | | | | | | | |
|---|---|---|---|---|---|---|---|
| S112 | | | PSAH | 0.5 | 85 | 83 | 5.2 | 55.9 |
| S113 | — | | — | T3P | 0.5 | 86 | 84 | 5.5 | 67.3 |
| S114 | | | SCAH | 0.5 | 84 | 85 | 6.1 | 62.8 |
| S115 | | | PSAH | 0.5 | 83 | 86 | 5.9 | 61.3 |
| S116 | DTD | 2 | T3P | 0.5 | 90 | 92 | 4.7 | 57.5 |
| S117 | PS | 2 | T3P | 0.5 | 89 | 90 | 4.8 | 56 |
| S118 | PS | 2 | T3P | 0.5 | 87 | 89 | 4.9 | 52.5 |

Although this application has been described with reference to the implementations and the embodiments, this application is not limited to the examples described in the implementations and the embodiments, and various changes can be made. For example, as a kind of secondary battery, a lithium-ion secondary battery has been described. However, the applicable secondary battery type is not limited to this. The secondary battery of this application can be similarly applied to a secondary battery in which the capacity of the anode includes a capacity due to deintercalation of lithium ions and a capacity associated with precipitation and dissolution of lithium metal, and the battery capacity is represented by the sum of these capacities. In this case, an anode material capable of deintercalating lithium ions is used as the anode active material, and the chargeable capacity of the anode material is set to a value smaller than the discharge capacity of the cathode.

Further, this application is applicable to a cylindrical type, a laminated film type, and a battery device having a spirally wound structure. However, the applicable structure is not limited thereto. The secondary battery of this application can be similarly applied to a battery having other battery structures such as a square battery, a coin battery and a button battery, or a battery in which the battery device has other structures such as a laminated structure.

Further, the case of using lithium as an electrode reactant has been described. However, the electrode reactant is not necessarily limited to this. As the electrode reactant, for example, other Group 1 elements such as Na and K, Group 2 elements such as Mg and Ca, or other light metals such as Al may be used. The effect of this application can be obtained irrespective of the type of the electrode reactant, whereby a similar effect can be obtained even if the type of the electrode reactant is changed.

Further, regarding the values of the above respective components, the appropriate ranges derived from the results of the embodiments are explained. However, the description does not completely exclude the possibility that the content/value is outside the above range. That is, the above-described appropriate range/value is a particularly preferable range/value for obtaining the effect of the present application. Therefore, as long as the effect of the present application is obtained, the content may be outside the above range/value to some extent.

References to "some embodiments", "part of embodiments", "one embodiment", "another example", "example", "specific example" or "part of examples" in the whole specification mean that at least one embodiment or example in this application comprises specific features, structures, materials or characteristics described in the embodiments or examples. Thus, the descriptions appear throughout the specification, such as "in some embodiments", "in an embodiment", "in one embodiment", "in another example", "in one example", "in a specific example" or "an example", which does not necessarily refer to the same embodiment or example in this application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limiting this application, and the embodiments can be changed, substituted and modified without departing from the spirit, principle and scope of this application.

Abbreviation

| Abbr | Material Name | Abbr | Material Name |
|---|---|---|---|
| EC | Ethylene carbonate | PS | 1,3-propane sultone |
| PC | Propylene carbonate | DTD | Ethylene sulfate |
| GBL | γ-butyrolactone | SN | Succinonitrile |
| EP | Ethyl propionate | ADN | Adiponitrile |
| PP | Propyl propionate | HTCN | 1,3,6-hexane trinitrile |
| VC | Vinylene carbonate | EDN | Ethylene glycol bis(2-cyanoethyl)ether |
| FEC | Fluoroethylene carbonate | TCEP | 1,2,3-tris(2-cyanoethoxy)propane |
| $LiBF_4$ | Lithium tetrafluoroborate | T3P | 1-propylphosphoric acid cyclic anhydride |
| $LiPO_2F_2$ | Lithium difluorophosphate | SCAH | Succinic anhydride |
| $LiPF_6$ | Lithium hexafluorophosphate | PSAH | Sulfopropionic anhydride |
| LiFSI | Lithium trifluoromethane-sulfonylimide | TFEMC | Methyl trifluoroethyl carbonate |
| Cis DFEC | Cis 4,4-difluoroethylene carbonate | ETFEC | Ethyl trifluoroethyl carbonate |
| Trans DFEC | Trans 4,4-difluoroethylene carbonate | | |

The invention claimed is:

1. An electrochemical device, comprising: a cathode, an anode and an electrolytic solution; wherein
the anode comprises a carbon material and hydroxyalkyl methylcellulose, the carbon material having at least one of natural graphite or artificial graphite, and the hydroxyalkyl methylcellulose comprises one or more selected from the group consisting of hydroxyalkyl methylcellulose sodium and hydroxyalkyl methylcellulose lithium, and an alkyl group in the hydroxyalkyl methylcellulose has 1-8 carbon atoms;
the electrolytic solution comprises propionate, wherein the propionate is a compound of Formula 1:

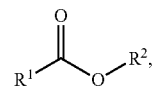

wherein,

R$^1$ is ethyl or haloethyl, and

R$^2$ is alkyl or haloalkyl having 1-6 carbon atoms;

the electrolytic solution further comprises an additive;

a content of the additive is about 0.01% to about 15% based on a total weight of the electrolytic solution;

the additive comprises a fluorocarbonate; and the fluorocarbonate comprises fluoroethylene carbonate; and the additive further comprises a compound having 2-4 cyano groups, and the compound having 2-4 cyano groups comprises at least one of adiponitrile or 1,2,3-tris(2-cyanoethoxy) propane.

2. The electrochemical device as claimed in claim 1, wherein a specific surface area of the carbon material is less than or equal to 3 m$^2$/g.

3. The electrochemical device as claimed in claim 1, wherein the carbon material is the artificial graphite, and the specific surface area of the artificial graphite is less than or equal to 3 m$^2$/g.

4. The electrochemical device according to claim 1, wherein the anode further comprises one or more of a silicon material, a silicon-carbon composite material, a silicon-oxygen material, an alloy material or a lithium-containing metal composite oxide material.

5. The electrochemical device according to claim 1, wherein the fluorocarbonate has the formula C=O(OR1)(OR2), wherein R1 and R2 are each selected from alkyl or haloalkyl having 1-6 carbon atoms, wherein at least one of R1 and R2 is selected from fluoroalkyl having 1-6 carbon atoms; and R1 and R2 form a 5- to 7-membered ring along with the atoms to which R1 and R2 are connected.

6. The electrochemical device according to claim 1, wherein the fluorocarbonate further comprises one or more selected from the group consisting of cis 4,4-difluoroethylene carbonate, trans 4,4-difluoroethylene carbonate, 4,5-difluoroethylene carbonate, 4-fluoro-4-methylethylene carbonate, 4-fluoro-5-methylethylene carbonate, methyl trifluoromethyl carbonate, methyl trifluoroethyl carbonate and ethyl trifluoroethyl carbonate.

7. The electrochemical device according to claim 1, wherein a content of the propionate is about 1.5 to about 30 times that of the additive based on the total weight of the electrolyte.

8. The electrochemical device according to claim 1, wherein the electrolytic solution further comprises one selected from the group consisting of LiPF$_6$, LiBF$_4$, LiPO$_2$F$_2$, LiSbF$_6$, LiAsF$_6$, LiC$_4$F$_9$SO$_3$, LiClO$_4$, LiB(C$_2$O$_4$)$_2$ and LiN(CxF$_{2x+1}$SO$_2$)(CyF$_{2y+1}$SO$_2$), wherein x and y are integers in the range of 1-5.

9. The electrochemical device according to claim 8, wherein the electrolytic solution comprises LiPO$_2$F$_2$.

10. The electrochemical device according to claim 1, wherein the electrolytic solution further comprises a non-aqueous solvent; the non-aqueous solvent comprises at least one selected from the group consisting of a cyclic carbonate, a chained carbonate, a cyclic carboxylate, a chained carboxylate, a cyclic ether, a chained ether, a phosphorus-containing organic solvent, a sulfur-containing organic solvent and an aromatic fluorine-containing solvent.

11. The electrochemical device according to claim 1, wherein the compound having 2-4 cyano groups further comprises at least one selected from the group consisting of succinonitrile, glutaronitrile, 1,5-dicyanopentane, 1,6-dicyanohexane, tetramethyl succinonitrile, 2-methylglutaronitrile, 2,4-dimethylglutaronitrile, 2,2,4,4-tetramethylglutaronitrile, 1,4-dicyanopentane, 1,4-dicyanopentane, 1,2-dicyanobenzene, 1,3-dicyanobenzene, 1,4-dicyanobenzene, ethylene glycol bis(propionitrile)ether, 3,5-dioxa-pimelonitrile, 1,4-bis(cyanoethoxy)butane, diethylene glycol bis(2-cyanoethyl) ether, triethylene glycol bis(2-cyanoethyl) ether, tetraethylene glycol bis(2-cyanoethyl) ether, 1,3-bis(2-cyanoethoxy)propane, 1,4-bis(2-cyanoethoxy)butane, 1,5-bis(2-cyanoethoxy)pentane, ethylene glycol bis(4-cyanobutyl) ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentanetricarbonitrile, 1,2,3-propanetricarbonitrile, 1,3,6-hexanetricarbonitrile, 1,2,6-hexanetricarbonitrile, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane and 1,2,5-tris(cyanoethoxy)pentane.

12. The electrochemical device according to claim 1, wherein the propionate further comprises at least one selected from the group consisting of methyl propionate, ethyl propionate, propyl propionate, butyl propionate, amyl propionate, methyl halopropionate, ethyl halopropionate, propyl halopropionate, butyl halopropionate and amyl halopropionate; and wherein a halo group in the methyl halopropionate, ethyl halopropionate, propyl halopropionate, butyl halopropionate and amyl halopropionate is selected from one or more of a fluoro group (—F), a chloro group (—Cl), a bromo group (—Br) or an iodo group (—I).

13. The electrochemical device as claimed in claim 2, wherein the specific surface area of the carbon material is in a range of 1.5 m$^2$/g to 2 m$^2$/g.

14. The electrochemical device as claimed in claim 1, wherein a ratio of a content of the propionate to a content of the fluorocarbonate in the electrolytic solution is in a range of 3 to 10.

15. The electrochemical device as claimed in claim 1, wherein a content of the propionate in the electrolytic solution is in a range of 10 wt % to 50 wt %.

16. The electrochemical device according to claim 1, wherein the additive further comprises one selected from the group consisting of carbon-carbon double bond-containing ethylene carbonate, a sulfur-oxygen double bond-containing compound, a cyclic carboxylate, a cyclic phosphoric anhydride, a carboxylic anhydride, a sulfonic anhydride and a carboxylic sulfonic anhydride.

17. An electronic device, comprising the electrochemical device of claim 1.

* * * * *